Patented Oct. 6, 1936

2,056,211

UNITED STATES PATENT OFFICE 2,056,211

RESINOUS CONDENSATION PRODUCTS AND METHOD OF PRODUCING SAME

Israel Rosenblum, Jackson Heights, N. Y.

No Drawing. Application July 12, 1930, Serial No. 467,623. Renewed October 31, 1934

21 Claims. (Cl. 260—4)

My invention relates to synthetic resins and has for its object to produce resinous condensation products of great complexity and extraordinarily high molecular weight with the aid of a polyhydric inorganic acid or its anhydride.

It is also an object of the present invention to produce synthetic resins of ready solubility in the common solvents, such as mineral spirits, toluol, ethyl acetate, etc., and of substantially neutral reaction, good consistency and body, which are compatible with nitrocellulose and other cellulosic lacquers and may be used in conjunction therewith, and also with a great variety of natural and synthetic gums used in the lacquer and varnish industry.

It is well known that polyhydric alcohols, such as glycerol, may be either completely or partially esterified with monobasic or polybasic acids to produce esters which, in certain cases, are of resinous character or can be condensed or polymerized into resinous or approximately resinous substances by more or less prolonged heating at elevated temperatures. The reactions occurring during the formation of many of the synthetic resinous products are not thoroughly understood, but it is probable that during the first stages of the reaction a part of the polyhydric alcohol is under certain conditions only partially esterified (especially when an excess of the alcohol is present), and that during the subsequent heating the free hydroxyl groups of two or more molecules condense and become united through an oxygen bond to form a more complex molecule.

According to the present invention, a plurality of molecules of partial esters formed by partially neutralizing a polyhydric alcohol with an aliphatic acid or acids such as malic acid, maleic acid, their anhydrides, or mixtures of these acidic substances (which esters may or may not themselves be of resinous character) are united or condensed with the aid of an inorganic polybasic acid or its anhydride which directly forms the bond between such molecules. In this way, a plurality of large organic molecules may be condensed by an inorganic acid of relatively low molecular weight, so that a very complex product may be obtained with the use of a comparatively small quantity of inorganic acid. The relative quantities of reacting materials and the other conditions are so regulated that the complex substances so produced contain one or more free hydroxyl groups in the molecule which are then caused to combine with an acidic reaction product of a phenol, an aldehyde and an organic salt of zinc or other metal, such as described in my United States Patents Nos. 1,808,716 and 1,809,570. In this manner I obtain very complex resins having highly desirable properties and composed of a polyhydric alcohol, a monobasic or polybasic organic acid, a polybasic inorganic acid, and the reaction product of a phenol, an aldehyde, and the organic salt of a metal.

In order that my invention may be better understood, I shall describe the same in connection with the production of complex resins from malic acid (or anhydride), glycerol, boric acid, and the acidic condensate obtained by condensing phenol and formaldehyde in the presence of an organic salt of zinc, such as zinc abietate.

Malic acid, for example, may be caused to be combined in any known manner with an excess of glycerol to produce hydroxy-esters, of which the following simple compounds are illustrative:

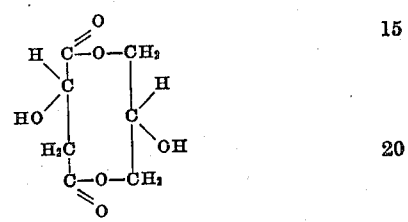

and

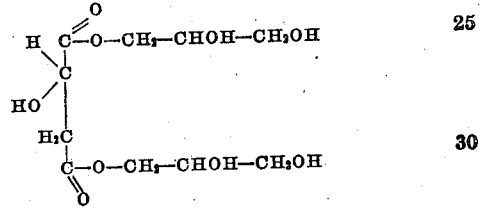

Other compounds are doubtless produced but only these are represented for the sake of simplicity as they are sufficient to illustrate the nature of the present invention. The mixture of hydroxy-esters is then caused to react with boric acid ($H_3BO_3$) at about 140–150° C., whereupon condensation takes place producing, among other compounds, the following comparatively simple compound (assuming that one molecule of boric acid reacts with a molecule of each of the hydroxy-esters formulated above):

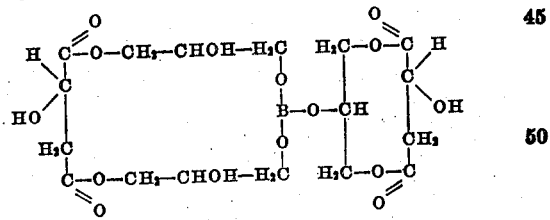

The above compound probably represents only an intermediate product, for the two free hydroxyls may condense with the hydroxyl groups of similar products or of non-boronized hydroxy-esters, either directly or with the aid of additional boric acid. It will thus be seen that extreme complexity of molecular structure may be obtained in a number of ways with the aid of the inorganic acid.

Condensates produced in the presence of boric acid in which the latter is held in chemical combination may be termed "boronized" condensates, and I shall use this term in the subsequent description of my invention in the sense indicated. The boronized, i. e. boron containing, condensates obtained as indicated above are characterized by great body, a property which has heretofore been imparted to glycerol-polybasic organic acid resins only with the aid of additions, such as rosin.

Products of greater solubility and flexibility may, in accordance with the present invention, be obtained by treating the boronized hydroxy-esters with acids until the same are substantially neutral. Organic acids of any kind may be employed, such as acetic, succinic, tartaric, benzoic, phthalic, malic, maleic, etc., and also resin acids, either natural or synthetic. Excellent results are obtained by the use of the higher aliphatic acids, such as oleic, linoleic, linolenic, ricinoleic, stearic, palmitic, and other acids obtainable from drying and non-drying fatty oils. In general, I prefer to employ rosin or other natural resin (which is, of course, acidic in nature) in conjunction with any of the acids just specified. Improved results are generally obtained if the natural resin, if used, and particularly rosin, is first cracked or dry-distilled, as by heating to a temperature of about 260° C. or above. I may also employ, either alone or together with linoleic or any of the other acids mentioned, a condensation product of phenol, formaldehyde, a natural resin, such as rosin, and an organic salt, such as a zinc soap, specifically zinc abietate, as described in my above mentioned patents. The acidic compounds just enumerated will combine with the boronized hydroxy-esters of glycerol and malic or maleic acid and neutralize the same, thereby producing extremely complex esters of glycerol with malic or maleic acid, boric acid, and one or more of the other organic acids mentioned above.

The treatment of the boronized hydroxy-esters with the acids mentioned above are described and, excepting the treatment with the phenol-formaldehyde condensation product, claimed in my co-pending application, Serial No. 438,901, filed March 25, 1930. The present application is directed to the treatment of the boronized hydroxy aliphatic acid esters with a phenol-aldehyde condensate and to the products obtained thereby, and is a continuation in part of my co-pending application, Serial No. 441,731, filed April 4, 1930, now Patent 1,969,761.

As indicated above, and as preferably carried out, the reaction between the partial ester of glycerol and malic (or maleic) acid and the boric acid is made to take place under such proportions and conditions that the resulting product contains free basic hydroxyl groups. As is well known, the reaction product of phenol and formaldehyde is usually of acidic nature, particularly if the condensation is made to take place in the presence of rosin or other natural resin. I have found that the hydroxy boronized condensate can be made to combine with the acidic phenolic condensate to produce a substantially neutral, highly complex resin having very valuable properties, particularly with regard to solubility, body, luster and compatibility with cellulosic and other lacquers and varnishes.

The reaction may be made to occur in steps, as by first treating the malic (or maleic) acid with glycerol and then reacting the hydroxy-esters so produced with boric acid and finally heating the boronized hydroxy-esters with the phenolic condensate until a substantially neutral product is obtained; or else all of the ingredients in proper proportions may be made to react simultaneously.

Instead of combining the condensate of boric acid with the hydroxy glycerol-malic acid esters (or other hydroxy-esters) directly with the phenolic condensate, the free basic hydroxyls of these boronized esters may be combined with the acidic compounds obtained by condensing with an excess of boric acid the hydroxy-esters obtained by partially neutralizing glycerol with an acidic phenolic condensate, preferably one formed in the presence of an organic salt. In this way, complex compounds are obtained in which what may be regarded as a nucleus composed of an ester of glycerol and malic acid is joined through boron bonds to one or more other glycerol-malic acid esters and to one or more glycerol esters of phenolic condensates. As an example of the phenol condensates, I may mention the acidic reaction product of phenol and formaldehyde produced in the presence of rosin (or other natural resin) and of an organic salt (preferably of a high molecular weight fatty or resin acid, such as abietic acid) of zinc or other metal, such as calcium, strontium, barium, magnesium, lead, etc. Instead of partially neutralizing glycerol with an acidic phenolic condensate, as stated above, I may partially neutralize it with such condensate together with rosin or other natural resin, or together with any of the other organic acids listed hereinabove. In general, I prefer to use, in place of the rosin as it is commercially available, rosin which has been heated or cracked in the presence of an organic zinc (or other metal) salt-phenol-aldehyde condensate. By the use of such zinc-phenol-aldehyde condensate, the product is made more resistant, while at the same time the formation of compounds, which crystallize out from ethyl acetate solution and are not colloidal or film-forming, is prevented. It will be understood that, in place of rosin, other resins, such as the fossil resins, may be employed which are similarly dry-distilled or cracked preferably in the presence of an organic salt-phenol-formaldehyde condensate.

By the above procedure, extremely complex resins are obtained which are highly weather and waterproof, have excellent body and are compatible with cellulosic lacquers. My novel boronized condensates produce varnishes having a very glossy and lustrous surface. They also make excellent wood fillers.

Several modes of carrying out my invention are described hereinbelow, but it will be understood that the examples are given by way of illustration only and are not to be construed in a limiting sense.

*Example 1.*—134 grams of malic acid, 31 grams of boric acid, and 150 grams of glycerol are heated together with 50 grams of the acidic condensate obtained by condensing phenol, formaldehyde, and an organic salt of a metal, such as zinc, in the presence of a solvent or flux, such as natural resins and drying and non-drying oils, as described in my above-mentioned patents, and 140 grams of stearic acid. The temperature is maintained at about 240° C. until a sample is found to be completely soluble in toluol. The resin obtained is compatible with solutions of nitrocellulose.

*Example 2.*—280 grams of linoleic acid, 200 grams of glycerol (98% pure), and 31 grams of boric acid are heated at about 180° C. for two hours. There are then added 67 grams of malic acid and 300 grams of an organic zinc salt-phenol-formaldehyde condensate (prepared as described in my United States patents above referred to). The temperature is permitted to rise to about 230° C. and kept at that temperature until a sample of the product forms a clear solution in toluol.

*Example 3.*—The procedure outlined under Example 2 is followed except that, in place of part of the zinc salt-phenol-formaldehyde condensate, there is used an equivalent quantity of dry-distilled or non-distilled rosin or any dry-distilled fossil gum.

If desired, an excess of fatty acids may be employed in the examples given above because the same are compatible with my novel boronized condensates.

As indicated above, any suitable polyhydric alcohol other than glycerol may be used, such as glycol, mannitol, etc.; in place of malic acid, maleic acid, or their anhydrides, or mixtures of these acids, may be used; and in place of boric substances, may be used; and in place of boric acid any other suitable polyhydric inorganic acid, such as telluric, phosphoric, arsenic, silicic acids, etc., or their anhydrides may be employed. If desired, the reactions described hereinabove may be made to take place in the presence of a natural resin, preferably dry-distilled, which may act as a solvent, or may supply one of the reacting acids.

Variations may be resorted to within the scope of the appended claims without departing from the spirit of the invention.

What is claimed is:

1. The method of producing resinous condensation products of high molecular weight suitable for the manufacture of water-resisting coating compositions, which comprises heating and reacting a polyhydric alcohol, a polycarboxylic acid of the aliphatic series, a weak polybasic inorganic acid, and an acidic phenol-aldehyde resin in such proportions that a substantially neutral, clear condensate soluble in toluol is obtained.

2. The method of producing resinous condensation products of high molecular weight suitable for the manufacture of water-resisting coating compositions, which comprises heating and reacting a polyhydric alcohol, a polybasic carboxylic acid of the aliphatic series, a weak polybasic inorganic acid, an acid obtainable on hydrolysis of a fatty oil, and an acidic phenol-aldehyde resin in such proportions that a substantially neutral, clear condensate soluble in toluol is obtained.

3. The method of producing resinous condensation products of high molecular weight suitable for the manufacture of water-resisting coating compositions, which comprises heating and reacting a polyhydric alcohol, a dicarboxylic acid of the aliphatic series, a weak polybasic inorganic acid, an acid obtainable on hydrolysis of a drying fatty oil, and an acidic phenol-aldehyde resin in such proportions that a substantially neutral, clear condensate soluble in toluol is obtained.

4. The method of producing resinous condensation products of high molecular weight suitable for the manufacture of water-resisting coating compositions which comprises heating and reacting a polyhydric alcohol, an acid of the group consisting of malic and maleic acids and their anhydrides, a weak polybasic inorganic acid, an acid obtainable on hydrolysis of a fatty oil, and an acidic phenol-aldehyde resin in such proportions that a substantially neutral, clear condensate soluble in toluol is obtained.

5. The method of producing resinous condensation products of high molecular weight suitable for the manufacture of water-resisting coating compositions, which comprises heating and reacting glycerol, an acid of the group consisting of malic and maleic acids and their anhydrides, a weak polybasic inorganic acid, an acid obtainable on hydrolysis of a drying fatty oil, and an acidic phenol-aldehyde resin in such proportions that a substantially neutral, clear condensate soluble in toluol is obtained.

6. The method of producing resinous condensation products of high molecular weight suitable for the manufacture of water-resisting coating compositions, which comprises heating and reacting glycerol, an acid of the group consisting of malic and maleic acids and their anhydrides, boric acid, an acid obtainable on hydrolysis of a fatty oil, and an acidic phenol-aldehyde resin in such proportions that a substantially neutral, clear condensate soluble in toluol is obtained.

7. The method of producing resinous condensation products of high molecular weight suitable for the manufacture of water-resisting coating compositions, which comprises heating and reacting glycerol, an acid of the group consisting of malic and maleic acids and their anhydrides, boric acid, an acid obtainable on hydrolysis of a drying fatty oil, and an acidic organic material comprising a phenol-formaldehyde condensate in such proportions that a substantially neutral, clear condensate soluble in toluol is obtained.

8. The method of producing resinous condensation products of high molecular weight suitable for the manufacture of water-resisting coating compositions, which comprises heating and reacting glycerol, an acid of the group consisting of malic and maleic acids and their anhydrides, boric acid, at least one of the acids of linseed oil having more than one double bond, and an acidic organic material comprising a condensation product of a phenol, formaldehyde and an organic salt of a metal of the group consisting of the first and second groups of the periodic system, lead, cobalt and manganese in such proportions that a substantially neutral, clear condensate soluble in toluol is obtained.

9. The method of producing resinous condensation products of high molecular weight suitable for the manufacture of water-resisting coating compositions, which comprises heating and reacting glycerol, an acid of the group consisting of malic and maleic acids and their anhydrides, boric acid, and an acidic organic material comprising a phenol-formaldehyde-organic zinc salt condensate and a natural resin until a clear condensate soluble in toluol is obtained.

10. The method of producing resinous condensation products of high molecular weight suitable for the manufacture of water-resisting coating compositions, which comprises partially esterifying a quantity of glycerol with an acid obtainable on hydrolysis of a fatty oil in the presence of a weak polybasic inorganic acid, and heating the mass with a dicarboxylic aliphatic acid and a phenol-aldehyde condensate of acidic reaction until a soluble resinous condensate of reduced acid number is obtained.

11. The method of producing resinous condensation products of high molecular weight suitable for the manufacture of water-resisting coating compositions, which comprises partially esterifying a quantity of glycerol with an unsaturated acid of more than one double bond obtainable by the hydrolysis of a drying oil in the presence of a weak polybasic inorganic acid, and then heating the mass with a dicarboxylic aliphatic acid and with the reaction product of a phenol, an aldehyde and an organic salt of a metal of the group consisting of the first and second groups of the periodic system, lead, cobalt and manganese until a clear, substantially neutral resinous condensate is obtained.

12. The method of producing resinous condensation products of high molecular weight suitable for the manufacture of water-resisting coating compositions, which comprises reacting a free hydroxyl-containing partial glycerol ester of an acid obtainable on hydrolysis of a fatty oil, with a weak polybasic inorganic acid insufficient to neutralize all of the free hydroxyl groups until said esters are condensed, and reacting such condensed esters with a dicarboxylic aliphatic acid and a condensate of phenol, formaldehyde, and zinc abietate until a resinous condensation product is obtained.

13. The method of producing resinous condensation products of high molecular weight suitable for the manufacture of water-resisting coating compositions, which comprises reacting a free hydroxyl-containing partial glycerol ester of an unsaturated acid of more than one double bond obtainable by the hydrolysis of a drying oil with a weak polybasic inorganic acid until a condensate having free hydroxyl groups is obtained, and then reacting said condensate with maleic acid and with an acidic phenol-aldehyde condensate until a substantially neutral resinous product is obtained.

14. The method of producing resinous condensation products of high molecular weight suitable for the manufacture of water-resisting coating compositions, which comprises reacting a free hydroxyl-containing partial glycerol ester of linoleic acid and boric acid with maleic acid and an acidic organic compound including a phenol-aldehyde condensate containing an organic zinc salt until a substantially neutral resinous condensation product is obtained.

15. The soluble resinous composition suitable for the manufacture of water-resisting coating compositions and comprising the reaction product of an acidic phenol-aldehyde condensate and the hydroxyl-containing condensate of a polyhydric alcohol, a polycarboxylic aliphatic acid, a monobasic acid of the group consisting of fatty oil acids, fat acids, and natural resin acids, and a weak polybasic inorganic acid.

16. The soluble resinous composition suitable for the manufacture of water-resisting coating compositions and comprising the reaction product of an acidic phenol-formaldehyde condensate and a hydroxyl-containing condensate of glycerol, an acid obtainable by hydrolysis of a drying fatty oil, boric acid and maleic acid.

17. The method of producing resinous condensation products of high molecular weight suitable for the manufacture of water-resisting coating compositions which comprises reacting an acid of the group consisting of malic and maleic acid and their anhyrides, and glycerol in the presence of boric acid, the glycerol being in excess based on the combined quantity of malic or maleic and boric acids, and reacting the product with an acid obtainable on hydrolysis of a fatty triglyceride and with an acidic condensate of a phenol and aldehyde.

18. The soluble resinous composition suitable for the manufacture of water-resisting coating compositions and comprising the reaction product of maleic acid, boric acid, glycerol, an acid obtainable by hydrolysis of a drying oil, and an acidic phenol-formaldehyde condensate.

19. A soluble resinous product suitable for the manufacture of water-resisting coating compositions and comprising a condensate of glycerol, boric acid, an unsaturated acid obtainable on hydrolysis of a drying fatty oil and a dibasic aliphatic acid, substantially neutralized with a condensate of a phenol, formaldehyde, rosin and an organic salt of a metal of the group consisting of the first and second groups of the periodic system, lead, cobalt and manganese.

20. A soluble resinous condensate suitable for the manufacture of water-resisting coating compositions and comprising the reaction product of (1) the product obtained by reacting a weak polybasic inorganic acid, glycerol, and an acid obtainable on hydrolysis of a fatty oil, (2) a polycarboxylic aliphatic acid, and (3) an acidic phenol aldehyde condensate.

21. A soluble resinous condensate suitable for the manufacture of water-resisting coating compositions and comprising the reaction product of boric acid, glycerol, an acid obtainable on hydrolysis of a fatty oil, an acid of the group consisting of malic and maleic acids and their anhydrides, and a phenol-formaldehyde-organic zinc salt-rosin condensate.

ISRAEL ROSENBLUM.